(12) United States Patent
Kandhalu Raghu et al.

(10) Patent No.: US 12,255,799 B2
(45) Date of Patent: Mar. 18, 2025

(54) ADAPTIVE TIME SLOT ALLOCATION TO REDUCE LATENCY AND POWER CONSUMPTION IN A TIME SLOTTED CHANNEL HOPPING WIRELESS COMMUNICATION NETWORK

(71) Applicant: TEXAS INSTRUMENTS INCORPORATED, Dallas, TX (US)

(72) Inventors: Arvind Kandhalu Raghu, Plano, TX (US); Ramanuja E. Vedantham, Allen, TX (US); Ariton Xhafa, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/156,807

(22) Filed: Jan. 19, 2023

(65) Prior Publication Data

US 2023/0155915 A1 May 18, 2023

Related U.S. Application Data

(60) Continuation of application No. 17/141,301, filed on Jan. 5, 2021, now Pat. No. 11,588,719, which is a (Continued)

(51) Int. Cl.
*H04W 84/18* (2009.01)
*H04L 43/16* (2022.01)
*H04W 74/02* (2009.01)

(52) U.S. Cl.
CPC ............ *H04L 43/16* (2013.01); *H04W 74/02* (2013.01); *H04W 84/18* (2013.01)

(58) Field of Classification Search
CPC ...... H04L 43/16; H04W 74/02; H04W 84/18; H04W 72/0446; H04W 72/53; Y02D 30/70
See application file for complete search history.

(56) References Cited

U.S. PATENT DOCUMENTS

2004/0047293 A1* 3/2004 Arrakoski ............. H04L 12/417
  370/236
2005/0078672 A1* 4/2005 Caliskan ............... H04W 88/02
  370/389

(Continued)

OTHER PUBLICATIONS

IEEE Standard for Local and Metropolitan Area Networks, IEEE Std 802.15.4e-2012 (Amendment to IEEE Std 802.15.4-2011), IEEE Computer Society, Part 15.4: Low Rate Wireless Personal Area Networks (LR-WPANs), Amendment 1: MAC Sublayer, Apr. 16, 2012.

(Continued)

*Primary Examiner* — Meng Vang
*Assistant Examiner* — Hector Reyes
(74) *Attorney, Agent, or Firm* — Mandy Barsilai Fernandez; Frank D. Cimino

(57) ABSTRACT

Excessive latencies and power consumption are avoided when a large number of leaf nodes (LNs) contend simultaneously to join a time slotted channel hopping wireless communication network having a root node (RN) interfaced to LNs by one or more intermediate nodes (INs). A first plurality of shared transmit/receive slots (STRSs) is allocated for at least one IN, and a second plurality of STRSs is advertised for use by contending LNs, where the first plurality is larger than the second plurality. When a LN joins, its STRSs are re-defined such that most become shared transmit-only slots (STOSs) and no STRSs remain. The numbers of STRSs allocated to INs may vary inversely with their hop counts from the RN. One or more STOSs may be added for each of one or more INs in response to a predetermined network condition.

20 Claims, 2 Drawing Sheets

Related U.S. Application Data continuation of application No. 16/205,368, filed on Nov. 30, 2018, now Pat. No. 10,887,214, which is a division of application No. 15/053,678, filed on Feb. 25, 2016, now Pat. No. 10,187,285.

(60) Provisional application No. 62/169,876, filed on Jun. 2, 2015.

(56) References Cited

U.S. PATENT DOCUMENTS

| | | | |
|---|---|---|---|
| 2005/0176401 A1* | 8/2005 | Nanda | H04W 72/54 |
| | | | 455/403 |
| 2006/0209789 A1* | 9/2006 | Gupta | H04L 69/04 |
| | | | 370/352 |
| 2007/0274320 A1* | 11/2007 | Joshi | H04W 72/543 |
| | | | 370/395.2 |
| 2009/0067389 A1* | 3/2009 | Lee | H04W 74/02 |
| | | | 370/336 |
| 2010/0322209 A1* | 12/2010 | Mizuno | H04B 17/327 |
| | | | 370/336 |
| 2011/0013572 A1 | 1/2011 | Huang et al. | |
| 2012/0224537 A1* | 9/2012 | Bahr | H04W 48/12 |
| | | | 370/328 |
| 2013/0022083 A1 | 1/2013 | Vasseur | |
| 2013/0094481 A1 | 4/2013 | Jeong | |
| 2013/0100942 A1* | 4/2013 | Rudnick | H04B 7/2656 |
| | | | 370/337 |
| 2013/0107801 A1 | 5/2013 | Zheng | |
| 2013/0250928 A1* | 9/2013 | Choi | H04W 72/0446 |
| | | | 370/337 |
| 2013/0259016 A1 | 10/2013 | Xhafa | |
| 2013/0314229 A1* | 11/2013 | Tu | H04W 4/90 |
| | | | 340/539.22 |
| 2014/0204757 A1* | 7/2014 | Ishizaki | H04W 40/04 |
| | | | 370/235 |
| 2014/0334398 A1 | 11/2014 | Yeo | |
| 2015/0003468 A1 | 1/2015 | Thubert | |
| 2016/0021006 A1* | 1/2016 | Vasseur | H04L 45/04 |
| | | | 370/235 |
| 2016/0021011 A1 | 1/2016 | Vasseur | |
| 2016/0198344 A1 | 7/2016 | Oba | |
| 2017/0325224 A1 | 11/2017 | Shudark | |

OTHER PUBLICATIONS

Ariton E. Xhafa, et al., "Towards a Perpetual Wireless Sensor Node", 2013 IEEE Sensors, IEEE, Nov. 3, 2013, pp. 1-4, XP032532477, ISSN: 1930-0395, DOI: 1 0.11 09/ICSENS.2013.6688501 [retrieved on Dec. 18, 2013].

* cited by examiner

ADAPTIVE TIME SLOT ALLOCATION TO REDUCE LATENCY AND POWER CONSUMPTION IN A TIME SLOTTED CHANNEL HOPPING WIRELESS COMMUNICATION NETWORK

This application is a continuation of U.S. patent application Ser. No. 17/141,301, filed Jan. 5, 2021, which is a continuation of U.S. patent application Ser. No. 16/205,368, filed Nov. 30, 2018, now U.S. Pat. No. 10,887,214, which is a division of U.S. patent application Ser. No. 15/053,678, filed Feb. 25, 2016, now U.S. Pat. No. 10,187,285, which claims priority to U.S. Provisional Application No. 62/169,876, filed Jun. 2, 2015, each of which is incorporated herein by reference in its entirety.

FIELD

The present work relates generally to wireless communication networks that employ time slotted channel hopping and, more particularly, to techniques for accommodating increases in the number of nodes joining the network with reduced latency and power consumption.

BACKGROUND

The following documents are incorporated herein by reference:
IEEE STD 802.15.4; and
IEEE STD 802.15.4e.

FIG. 1 diagrammatically illustrates a simplified topology of a typical conventional wireless communication network operating in compliance with IEEE 802.15.4e, which is an amendment to the IEEE STD 802.15.4 radio communication protocol specification. This amendment specifically targets MAC protocol level modifications to enhance the performance of devices using IEEE 802.15.4 radios. A specific IEEE 802.15.4e MAC operation is referred to as Time Slotted Channel Hopping (TSCH), which enables robust as well as low-power communication. Channel hopping provides robustness against interference. The time slotted and time-synchronized nature of the protocol allows for time-scheduled communication. The scheduled communication means that the devices need to be active only when required and in "sleep" mode otherwise. This provides low-power operation.

As shown, the topology of FIG. 1 has a hierarchical structure with a plurality of hierarchical levels. The network of FIG. 1 includes at 11 a central root node (RN) that controls the network and serves as a gateway to higher bandwidth networks. A Level 1 intermediate node (IN) at 12 interfaces between the RN and a plurality of Level 2 INs at 13, which each in turn interfaces between the Level 1 IN 12 and one or more leaf nodes (LNs) at 14. The wireless communication links illustrated between the various nodes of FIG. 1 are also referred to herein as communication hops (or simply hops), such that, for example, RN 11 is three hops away from each LN at 14.

TSCH uses a sequence of time frames that are each divided into a plurality of slots of time (time slots). In the IEEE 892.15.4e scheduling scheme, each node is allocated a shared slot and at least one beacon slot in each time frame. A beacon slot is used by the RN 11 to transmit a beacon packet that contains the transmit/receive schedules of nodes in the network. Beacon slots are also used for time synchronization. The shared slot is a shared transit/receive slot (STRS) in which a node may either transmit or receive. New nodes attempting to associate with (join) the network contend for access to the STRS, and a successfully contending node transmits a network association request in the STRS. The STRS is the same interval of absolute time for each node of FIG. 1. The STRS is also used to convey network maintenance information and traffic routing information.

The RN 11 uses the STRS to transmit an association response in reply to an association request received from a successfully contending node. As new nodes join the network, they receive respectively corresponding association responses that allocate to them, in sequential fashion, respective pairs of dedicated slots. Each pair of dedicated slots consists of a transmit slot and a receive slot, both reserved for use only by the node to which they are allocated. If the joining node is an IN, the association response also allocates an additional beacon slot to the IN, to support the relay of beacon packets across the hops from the RN to the LNs.

A node operating in the network wakes up from sleep mode at every time slot and checks what function is to be performed. If none, it returns to the sleep state. The node listens in an active receive state during a beacon slot, an STRS and a dedicated receive slot, in order to ensure that no communication is missed. In a dedicated transmit slot, the node transmits as needed, or returns to sleep if it has nothing to transmit.

BRIEF DESCRIPTION OF THE DRAWINGS

In the drawings referenced herein.

DETAILED DESCRIPTION

Figure 1:
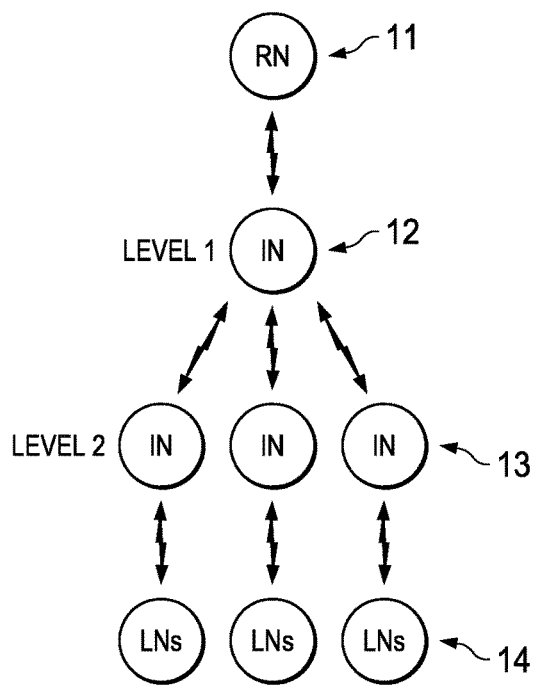
FIG. 1 diagrammatically illustrates a simplified topology of a conventional wireless communication network.

When many LNs attempt to join the network of FIG. 1 simultaneously, they will all contend during the single STRS, and the INs use the STRS to relay the association requests and responses. The present work has recognized that these factors can disadvantageously result in high latencies and high power consumption during association due to the contention for the STRS, and because all nodes consume power during the STRS. Every node awakes for the STRS, actively contends for access to the STRS if transmission is desired, and then transmits if contention is successful. Also, if transmission is not desired, or if contention is not successful, the node still listens in the active receive state. The latency and power consumption problems will be further exacerbated by the aforementioned use of the STRS for communication of network maintenance information and traffic routing information.

The present work has also recognized that the aforementioned latency and power consumption problems might be addressed by providing additional STRSs. However, simply increasing the number of STRSs would significantly increase power consumption because, as indicated above, all nodes would need to be awake in each STRS.

Example embodiments of the present work apply strategic solutions to the latency and power consumption problems encountered as TSCH networks experience increased demand of nodes attempting to join the network. These solutions exploit factors such as: INs (which have relatively large batteries or power-harvesting capabilities) are typically less power-constrained than LNs (which have relatively small batteries); INs at higher levels of the hierarchy experience more traffic than INs at lower levels; the operating profile of an LN changes after it becomes associated with the network; and the post-association operating profile of the LN typically requires more uplink communication (to the RN) than downlink communication (from the RN). As described in detail below, the RN uses messages such as beacon packets and association responses to implement solutions according to example embodiments of the present work.

To alleviate the latency and power consumption problems, an RN according to example embodiments of the present work allocates for LN association contention a suitably-sized plurality of STRSs to help accommodate a large LN association contention load. The RN transmits a beacon message (beacon packet) that advertises the number of STRSs allocated for LNs to use in contending for association. All nodes desiring network association may then contend for association in each of the advertised STRSs.

In some embodiments, when the RN responds to a successful association request, its association response (transmitted across network hops in STRSs) re-defines the plurality of shared slots available to the newly associated LN, such that the shared slots comport with the post-association operating profile of the LN and provide for reduced LN power consumption. For example, LNs in sensor applications typically use uplink extensively for data transfer. Accordingly, some embodiments re-define the plurality of STRSs such that: at least one STRS is changed to a shared receive-only slot (SROS) in which the LN may only receive communications; and the rest (a majority) of the STRSs are changed to shared transmit-only slots (STOSs) in which the LN may only transmit communications. A SROS always requires power consumption for listening in the active receive state, whereas an STOS requires power consumption only when the node has information to transmit, in which case the node contends for the STOS and, if the contention is successful, transmits the information. Because the re-definition of the STRSs results in allocation of mostly STOSs to the LN, it comports with the LN's post-association operating profile (mostly uplink transmissions). Because the re-definition is complete, i.e., it retains none of the STRSs, it avoids unnecessary LN power consumption. In some embodiments, the re-definition changes only one STRS to an SROS, and changes the rest of the STRSs to STOSs. In some embodiments, the re-definition adds one or more further STOSs such that the LN is actually allocated a total number of SROS(s) and STOSs that is larger than the total number of STRSs that were initially available to the LN for contending to join the network.

Because INs also experience increased traffic as large numbers of LNs attempt to join the network, in some embodiments, the RN allocates a relatively large number of STRSs to an IN. The RN's association response to a joining IN is used in some embodiments to communicate this allocation of STRSs. In some embodiments, the number of STRSs allocated to an IN exceeds the number of STRSs advertised for use by LNs contending for network association. Because a IN is typically less power-constrained than a LN, the added power-consumption required by the relatively large number of STRSs allocated to the INs will generally be acceptable. Furthermore, because a higher level IN (e.g., Level 1 IN of FIG. 1) handles more traffic than an associated lower level IN (e.g., Level 2 IN of FIG. 1), more STRSs may be allocated for a higher level IN than for an associated lower level IN. Note that the RN knows the hierarchical level of a joining IN by inspecting the hop count conventionally provided in the association request received from the IN. The hop count is incremented at each hop traversed by the association request.

As network conditions change, it may be helpful to provide one or more INs with more network communication capacity. For example, as the number of LNs in the network increases, one or more INs may require more uplink capacity to accommodate increased uplink traffic from the LNs. In some embodiments, when the RN detects that the number of LNs in the network exceeds a predetermined threshold, it transmits a beacon message to add one or more STOSs (and/or one or more SROSs) to the shared slot allocation of each of one or more INs. Some embodiments limit the number of STOSs/SROSs added for an IN such that its resulting total allocation of STOSs and SROSs and STRSs does not exceed the number of STRSs allocated to any associated IN at the next higher level of the hierarchical topology.

In some embodiments, the aforementioned messages (i.e., beacon messages and association responses) used to implement solutions according to the present work employ payload information elements (IEs) that are conventionally available in those messages. The payload IEs are suitably formatted to indicate the location of the shared slots, how many shared slots are STOS, how many shared slots are SROS, and how many shared slots are STRS. In the instances where a beacon message advertises STRSs for association contention, the payload IE contains a predetermined broadcast identifier such that all potentially joining nodes are informed. In the other above-described instances of shared slot re-definition and shared slot allocation, the payload IE (whether in a beacon message or an association request) contains information that identifies the node to which the payload IE is directed.

Figure 2A:
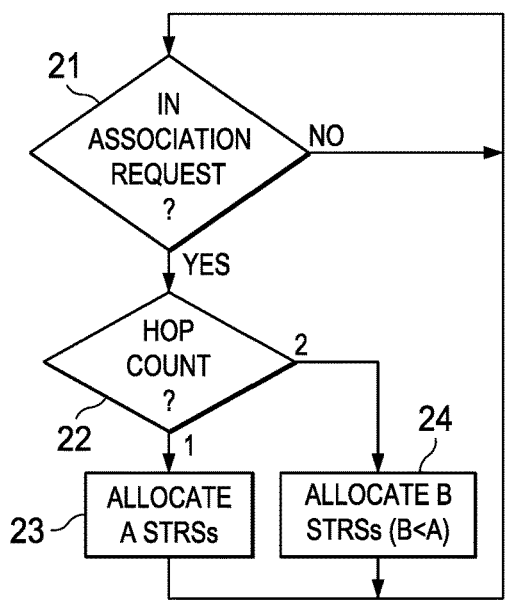
FIGS. 2A and 2B illustrate operations that can be performed in a network such as shown in FIG. 1 according to example embodiments of the present work.
Figure 2B:
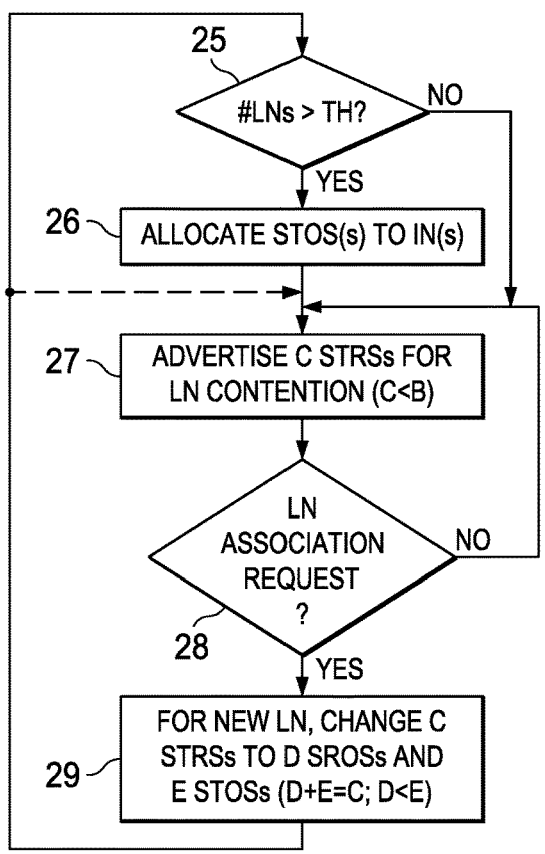

FIGS. 2A and 2B illustrate operations described above that can be performed in a network such as shown in FIG. 1 according to example embodiments of the present work. The illustrated operations are performed by the RN. When an association request is received from an IN at 21 in FIG. 2A, the hop count in the request is inspected at 22. If the hop count=1, then the IN is joining at Level 1 (see also FIG. 1), so a total of A STRSs are allocated to the IN at 23. If the hop count=2, then the IN is joining at Level 2, so a total of B (B<A) STRSs are allocated at 24.

At 25 and 26 in FIG. 2B, there is illustrated the allocation of one or more STOSs (and/or one or more SROSs) to each of one or more INs, in response to detection of a predetermined condition in the network. In the example of FIG. 2B, the predetermined condition is the number of LNs in the network exceeding a threshold TH, as shown at 25. If the condition at 25 is satisfied, the aforementioned allocation of one or more STOSs (and/or one or more SROSs) to each of one or more INs occurs as shown at 26.

At 27 in FIG. 2B, there is illustrated advertisement of C (C<B) STRSs for LNs to use in contending for network association. If a LN association request is received at 28, the C STRSs advertised at 27 are changed for the new LN at 29, to become D SROS(s) and E STOSs, where D+E=C and D<E. As noted above, the re-definition at 29 may also include addition of one or more further STOSs (not explicitly shown in FIG. 2B). After the re-definition at 29, operations may proceed to check for the network condition at 25, unless that condition was already detected previously, in which case operations proceed to 27 as shown by broken line in FIG. 2B.

In some embodiments, the value of threshold TH is updated (increased) in response to a "yes" decision at 25 in FIG. 2B, thus providing for the possible allocation of further STOSs/SROSs (at 26) as the network grows. In such case, the broken line path from 29 to 27 in FIG. 2B would be omitted.

Figure 3:
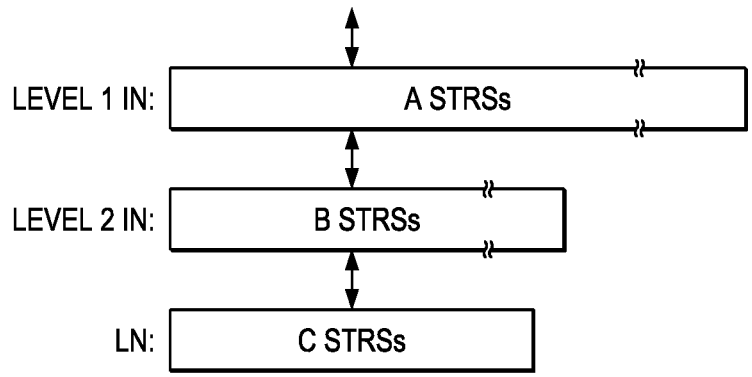
FIGS. 3 and 4 diagrammatically illustrate allocations of shared slots according to example embodiments of the present work.
Figure 4:
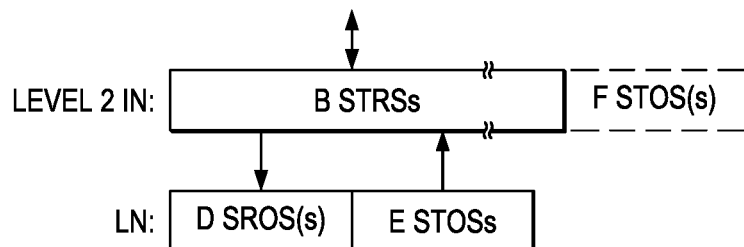

FIGS. 3 and 4 show bar graphs that illustrate example allocations of shared slots to a Level 1 IN, a Level 2 IN and a LN according to example embodiments of the present work. FIG. 3 shows allocations existing before the LN has joined the network, and FIG. 4 shows allocations after the LN joins. FIG. 3 shows A, B and C STRSs allocated for use by the Level 1 IN, the Level 2 IN and the LN, respectively, with A>B>C. FIG. 4 shows post-association shared slot re-definition for the LN such that the STRSs previously allocated to the LN (see FIG. 3) for association contention are changed to D SROS(s) and E STOSs, with D<E and D+E=C. FIG. 4 also shows, in broken line, F STOSs added to the shared slot allocation of an IN (Level 2 IN in this example) in response to detection of a predetermined condition in the network. As one particular illustrative example, some embodiments have A=10, B=6, C=4, D=1, E=3 and F=4. As another particular example, the LN's shared slot re-definition in some embodiments (not shown in FIG. 4) adds two further STOSs for the LN, resulting in a total of E+2 (e.g., 3+2=5) STOSs and C+2 total shared slots for the LN, with C+2<B<A.

Figure 5:
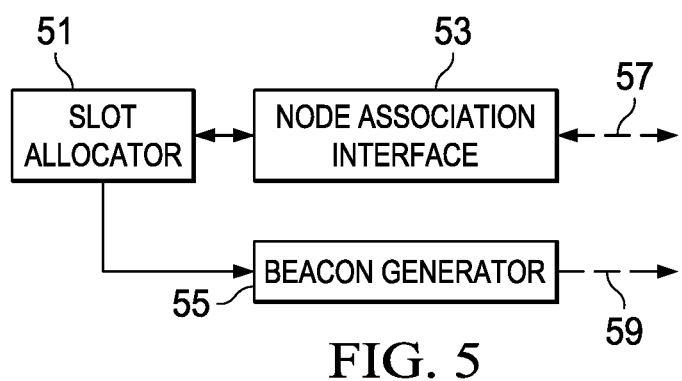
FIG. 5 diagrammatically illustrates an apparatus for use as a root node in a network such as shown in FIG. 1 according to example embodiments of the present work.

FIG. 5 diagrammatically illustrates an apparatus for use as a RN in a TSCH wireless communication network such as shown in FIG. 1 according to example embodiments of the present work. Various conventional structures and functions not necessary for understanding the present work may be omitted. The apparatus of FIG. 5 is capable of performing operations described above and shown in FIGS. 2-4. A slot allocator 51 is coupled for communication with a node association interface 53 and a beacon generator 55. In some embodiments, the slot allocator 51, the node association interface 53 and the beacon generator 55 are collectively implemented by a suitably programmed data processor. As indicated diagrammatically by the broken line at 57, the node association interface 53 receives incoming association requests from nodes that are associating with the network, and outputs corresponding association responses for transmission through the network to the associating nodes. In some embodiments, the node association interface 53 uses conventional techniques to analyze each incoming association request, and then forwards to the slot allocator 51 pertinent information from the association request. For example, in some embodiments, the node association interface 53 forwards to the slot allocator 51 information such as the type of node (LN or IN) that sent the incoming association request, and the hop count contained in the association request. The slot allocator 51 determines the shared slot allocation for the associating node based on the association request information received from the node association interface 53, and forwards the determined shared slot allocation to the node association interface 53. The node association interface 53 prepares for the associating node an association response that contains the determined shared slot allocation, and then outputs the association response at 57 for transmission through the network to the associating node.

The beacon generator 55 receives shared slot allocation information from the slot allocator 51, prepares a beacon message that contains the received shared slot allocation information, and outputs the beacon message at 59 for transmission through the network. As described above, beacon messages are used to advertise STRSs allocated by the slot allocator 51 for use by nodes contending to associate with the network. As also described above, beacon messages are used to inform INs that STOSs and/or SROSs (allocated by slot allocator 51) are added to their shared slot allocations. In some embodiments, the slot allocator 51 maintains a count of the number of LNs in the network, and compares this count with a threshold to determine when to add STOSs/SROSs to the shared slot allocations of INs (see also 25 and 26 in FIG. 2).

Although example embodiments of the present work are described above in detail, this does not limit the scope of the present work, which may be practiced in a variety of embodiments.

What is claimed is:

1. A method comprising:
   allocating, by a first node of a network, a number of shared transit/receive transmit/receive slots (STRSs) with contention-based access;
   transmitting a beacon message advertising the number of STRSs;
   receiving an association request from a second node via one of the number of STRSs; and
   in response to receiving the association request, changing the number of STRSs from a first value to a second value different from the first value, wherein, when the second node joins the network, one of the number of STRSs is changed to a receive-only slot, and another one of the number of STRSs is changed to a transmit-only slot.

2. The method of claim 1, wherein the transmit-only slot is a shared transmit-only slot (STOS) with contention-based access.

3. The method of claim 1, further comprising, when the second node joins the network, changing additional remaining STRSs to STOSs.

4. The method of claim 3, wherein the receive-only slot is a shared receive-only slot (SROS), and wherein changing additional remaining STRSs to STOSs comprises changing additional remaining STRSs to STOSs so that a number of STOSs is higher than a number of SROs.

5. The method of claim 1, wherein the receive-only slot is a shared receive-only slot (SROS).

6. A method comprising:
   allocating, by a first node of a network, a number of shared transmit/receive slots (STRSs) with contention-based access;
   transmitting a beacon message advertising the number of STRSs;
   receiving an association request from a second node via one of the number of STRSs; and
   in response to receiving the association request, changing the number of STRSs from a first value to a second value different from the first value; and
   allocating a first number of transmit/receive slots to the second node when the second node is an intermediate node.

7. The method of claim 6, wherein the second node is associated with a first hop count, the method further comprising:

receiving an association request from a third node, the third node being another intermediate node that is associated with a second hop count that is lower than the first hop count; and in response to receiving the association request from the third node, allocating a second number of transmit/receive slots to the third node, wherein the first number of transmit/receive slots is higher than the second number of transmit/receive slots.

8. The method of claim 1, wherein the second node is an intermediate node, the method further comprising, when a predetermined condition is satisfied, transmitting a beacon message allocating additional time slots to the second node.

9. The method of claim 8, wherein the predetermined condition is satisfied when a number of nodes of the network exceeds a predetermined threshold.

10. A method comprising:
allocating, by a first node of a network, a number of shared transmit/receive slots (STRSs) with contention-based access;
transmitting a beacon message advertising the number of STRSs;
receiving an association request from a second node via one of the number of STRSs, wherein the second node is an intermediate node; and
in response to receiving the association request, changing the number of STRSs from a first value to a second value different from the first value;
when a number of nodes of the network exceeds a predetermined threshold, transmitting a beacon message allocating additional time slots to the second node; and
dynamically changing the predetermined threshold.

11. A method comprising:
allocating, by a first node of a network, a number of shared transmit/receive slots (STRSs) with contention-based access;
transmitting a beacon message advertising the number of STRSs;
receiving an association request from a second node via one of the number of STRSs; and
in response to receiving the association request, changing the number of STRSs from a first value to a second value different from the first value, wherein the beacon message comprises a payload information element (IE) that includes a predetermined broadcast identifier associated with potentially joining nodes.

12. The method of claim 1, wherein the second value is lower than the first value.

13. The method of claim 1, wherein an STRS of the number of STRSs is used for communication of network maintenance information and traffic routing information.

14. The method of claim 1, wherein the first node is a root node.

15. The method of claim 14, wherein the network is a first network, and wherein the root node serves as a gateway to a second network with a bandwidth higher than a bandwidth of the first network.

16. The method of claim 1, further comprising allocating time slots to the second node based on a type of the second node.

17. The method of claim 1, wherein the second node is a sensor node or an intermediate node.

18. The method of claim 1, wherein the network is a wireless communication network that uses Time Slotted Channel Hopping (TSCH).

19. The method of claim 1, wherein the network complies with IEEE 802.15.4e.

20. The method of claim 1, wherein the beacon message comprises a payload information element (IE) that includes a predetermined broadcast identifier associated with a potentially joining node.

* * * * *